US011593368B1

(12) United States Patent
Ganesh et al.

(10) Patent No.: US 11,593,368 B1
(45) Date of Patent: Feb. 28, 2023

(54) MAINTENANCE OF CLUSTERED MATERIALIZED VIEWS ON A DATABASE SYSTEM

(71) Applicant: Snowflake Inc., Bozeman, MT (US)

(72) Inventors: Varun Ganesh, San Bruno, CA (US);
Saiyang Gou, Los Angeles, CA (US);
Prasanna Rajaperumal, San Mateo, CA (US); Wenhao Song, Seattle, WA (US); Libo Wang, Foster City, CA (US); Jiaqi Yan, Menlo Park, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 17/661,545

(22) Filed: Apr. 29, 2022

Related U.S. Application Data

(60) Provisional application No. 63/266,256, filed on Dec. 30, 2021.

(51) Int. Cl.
*G06F 16/00* (2019.01)
*G06F 16/2453* (2019.01)
*G06F 16/28* (2019.01)
*G06F 16/22* (2019.01)
*G06F 16/2455* (2019.01)

(52) U.S. Cl.
CPC .... *G06F 16/24539* (2019.01); *G06F 16/2282* (2019.01); *G06F 16/24552* (2019.01); *G06F 16/285* (2019.01)

(58) Field of Classification Search
CPC ........... G06F 16/24539; G06F 16/2282; G06F 16/24552; G06F 16/285
See application file for complete search history.

(56) References Cited

U.S. PATENT DOCUMENTS

| 10,628,415 B1 * | 4/2020 | Rajaperumal ....... G06F 16/2393 |
| 10,997,147 B2 | 5/2021 | Yan et al. |
| 11,030,186 B2 | 6/2021 | Cruanes et al. |
| 2009/0064160 A1 * | 3/2009 | Larson ................ G06F 16/2393 718/104 |
| 2017/0371940 A1 * | 12/2017 | Chintakayala ........ G06F 16/254 |

* cited by examiner

*Primary Examiner* — Dinku W Gebresenbet
(74) *Attorney, Agent, or Firm* — Schwegman Lundberg & Woessner, P.A.

(57) ABSTRACT

A cluster view method of a database to perform compaction and clustering of database objects, such as database materialized view is shown. The database can comprise a cache to store changes to storage units of tables of the database objects. The cluster view method can implement clustering to remove data based on the cache and clustering to group the data of the materialized view.

30 Claims, 8 Drawing Sheets

MAINTENANCE OF CLUSTERED MATERIALIZED VIEWS ON A DATABASE SYSTEM

CROSS-REFERENCE TO RELATED APPLICATION

This application claims priority to U.S. Provisional Patent Application Ser. No. 63/266,256, filed Dec. 30, 2021, the contents of which are incorporated herein by reference in their entirety.

TECHNICAL FIELD

The present disclosure generally relates to efficiently managing data changes and data organization in a distributed database.

BACKGROUND

Databases are used for data storage and access in computing applications. A goal of database storage is to provide enormous sums of information in an organized manner so that it can be accessed, managed, and updated. In a database, data may be organized into rows, columns, and tables. Maintenance operations can be performed on a database to reduce the size of the database and organize the data for faster database results.

BRIEF DESCRIPTION OF THE DRAWINGS

Various ones of the appended drawings merely illustrate example embodiments of the present disclosure and should not be considered as limiting its scope.

DETAILED DESCRIPTION

Figure 1:
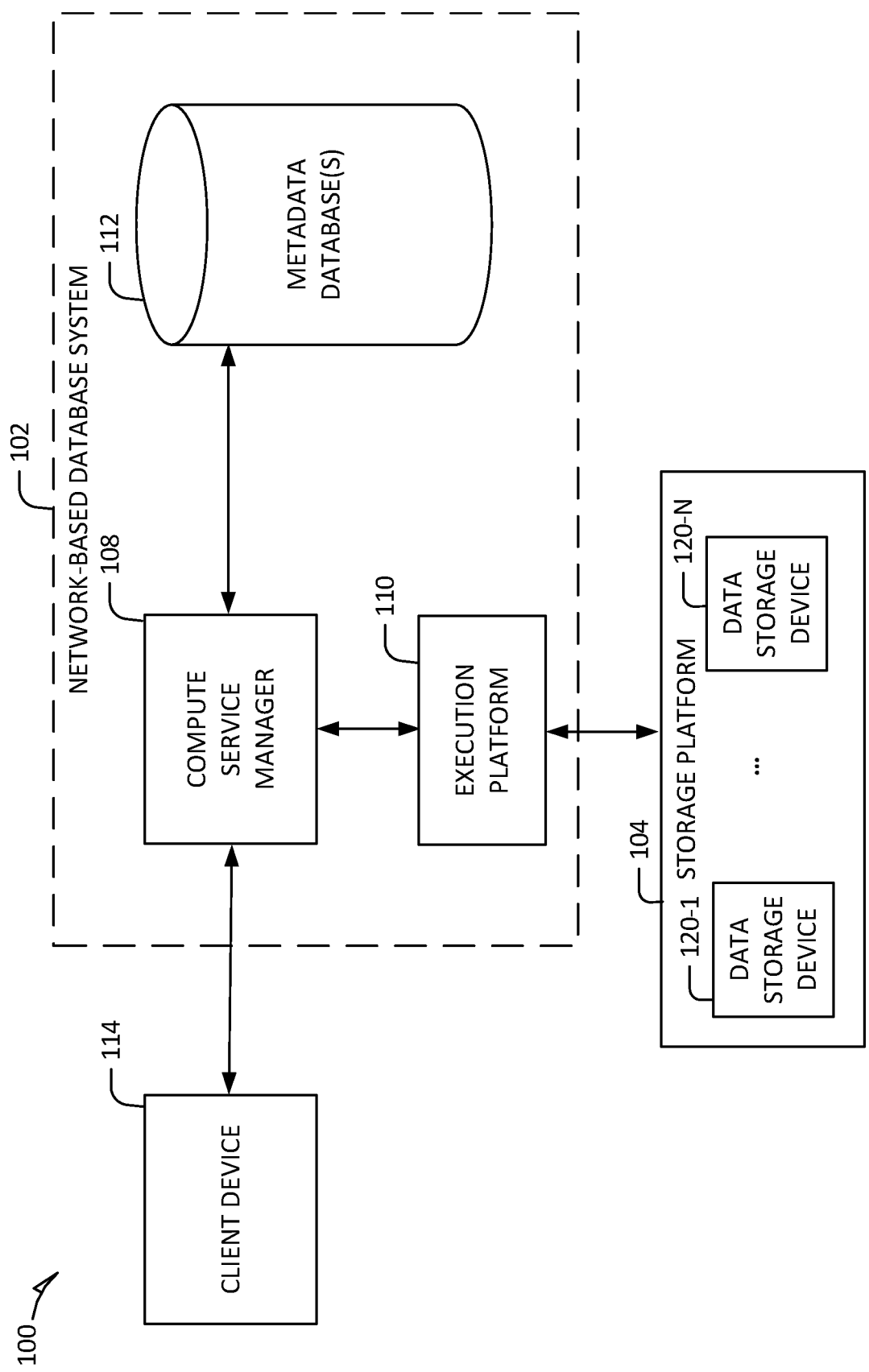
FIG. 1 illustrates an example computing environment in which a network-based database system can implement views, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Clustering is a process of organizing and reorganizing physical layouts of tables in a database to achieve approximate sorting with respect to a given clustering key (e.g., sort key). In some example embodiments, materialized views (MVs) store pre-computed data derived from a query specification based on one or more base tables. Clustering and materialized views can improve future query performance on a database. In some example embodiments, maintenance of both these features is performed to keep up with the one or more base tables states (e.g., changes to data in the base tables). In some example embodiments, automatic background clustering is configured to consistently re-cluster a base table data after new manipulation statements (e.g., DML statements) until the data again is in a well-clustered state. In some example embodiments, background materialized view maintenance (e.g., pull and compact) will identify newly inserted rows of a materialized view and remove stale results associated with deleted rows.

One issue for the background maintenance services is that they function independently and are unaware of each other, which can result in suboptimal performance with respect to each other. As an example, if a given materialized view is clustered, then when some rows are deleted from the base table of the materialized view, the auto-clustering system will still re-cluster the data corresponding to the deleted rows in the base table again and again, until materialized view compaction happens. As a further example, if a base table of a materialized view is clustered, the clustering operations on the base table trigger materialized view pull and compact multiple times, thereby incurring high cost of materialized view maintenance while the data in the base table has changed only minimally or not changed at all.

To address the foregoing issues, a cluster view system is configured to implement an efficient hybrid pipeline of the clustering and compaction processes such that they function in concert and are scheduled more efficiently to perform clustering of materialized view data while maintaining the integrity and accuracy of the data. In this way, the cluster view system significantly reduces the cost (e.g., compute resources used) of clustering and materialized view background maintenance.

In some example embodiments, the cluster view system is configured to perform an integrated task within a maintenance operation on a database. For example, for clustered materialized views, the cluster view system can perform materialized view compaction as part of a clustering operation such that stale rows are removed in a more efficient and data-safe manner, which saves costs associated with future clustering and materialized view maintenance. In some example embodiments, the cluster view system is configured to identify cases for which maintenance jobs are unnecessary (e.g., such as those that will not improve the table), and avoid scheduling those maintenance jobs in response to identification of the jobs. For example, if the base table of the materialized view is clustered, the cluster view system identifies which set of old files and new files (before and after clustering) are holding the same set of data and are thus equivalent; the cluster view system then only triggers materialized view pull and compact operations for non-equivalent inserted and deleted data. In some example embodiments, compaction is performed by storing the data of the materialized view in a staging location (e.g., table scanned data is stored in a temporary location in the database, execution node memory), performing compaction operations, and inserting the processed data to reform the materialized view. In some embodiments, clustering is performed by storing the materialized view in a staging location (e.g., temporary location in database, execution node memory), performing clustering operations, and inserting the processed data to reform the materialized view. In some example embodiments, the cluster view system is further configured to avoid scheduling materialized view maintenance while a clustering job for the base table is being performed to further increase computational efficiency.

FIG. 1 illustrates an example computing environment 100 that includes a database system in the example form of a network-based database system 102, in accordance with some embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other embodiments, the computing environment may comprise another type of network-based database system or a cloud data platform.

As shown, the computing environment 100 comprises the network-based database system 102 in communication with a cloud storage platform 104 (e.g., AWS®, Microsoft Azure Blob Storage®, or Google Cloud Storage). The network-based database system 102 is a network-based system used for reporting and analysis of integrated data from one or more disparate sources including one or more storage locations within the cloud storage platform 104. The cloud storage platform 104 comprises a plurality of computing machines and provides on-demand computer system resources such as data storage and computing power to the network-based database system 102.

The network-based database system 102 comprises a compute service manager 108, an execution platform 110, and one or more metadata databases 112. The network-based database system 102 hosts and provides data reporting and analysis services to multiple client accounts.

The compute service manager 108 coordinates and manages operations of the network-based database system 102. The compute service manager 108 also performs query optimization and compilation as well as managing clusters of computing services that provide compute resources (also referred to as "virtual warehouses"). The compute service manager 108 can support any number of client accounts such as end users providing data storage and retrieval requests, system administrators managing the systems and methods described herein, and other components/devices that interact with compute service manager 108.

The compute service manager 108 is also in communication with a client device 114. The client device 114 corresponds to a user of one of the multiple client accounts supported by the network-based database system 102. A user may utilize the client device 114 to submit data storage, retrieval, and analysis requests to the compute service manager 108.

The compute service manager 108 is also coupled to one or more metadata databases 112 that store metadata pertaining to various functions and aspects associated with the network-based database system 102 and its users. For example, a metadata databases 112 may include a summary of data stored in remote data storage systems as well as data available from a local cache. Additionally, a metadata databases 112 may include information regarding how data is partitioned and organized in remote data storage systems (e.g., the cloud storage platform 104) and the local caches. As discussed herein, a "micro-partition" is a batch storage unit, and each micro-partition has contiguous units of storage. By way of example, each micro-partition may contain between 50 MB and 500 MB of uncompressed data (note that the actual size in storage may be smaller because data may be stored compressed). Groups of rows in tables may be mapped into individual micro-partitions organized in a columnar fashion. This size and structure allows for extremely granular selection of the micro-partitions to be scanned, which can be comprised of millions, or even hundreds of millions, of micro-partitions. This granular selection process for micro-partitions to be scanned is referred to herein as "pruning." Pruning involves using metadata to determine which portions of a table, including which micro-partitions or micro-partition groupings in the table, are not pertinent to a query, and then avoiding those non-pertinent micro-partitions when responding to the query and scanning only the pertinent micro-partitions to respond to the query. Metadata may be automatically gathered about all rows stored in a micro-partition, including: the range of values for each of the columns in the micro-partition; the number of distinct values; and/or additional properties used for both optimization and efficient query processing. In one embodiment, micro-partitioning may be automatically performed on all tables. For example, tables may be transparently partitioned using the ordering that occurs when the data is inserted/loaded. However, it should be appreciated that this disclosure of the micro-partition is exemplary only and should be considered non-limiting. It should be appreciated that the micro-partition may include other database storage devices without departing from the scope of the disclosure. Information stored by a metadata databases 112 (e.g., key-value pair data store) allows systems and services to determine whether a piece of data (e.g., a given partition) needs to be accessed without loading or accessing the actual data from a storage device.

The compute service manager 108 is further coupled to the execution platform 110, which provides multiple computing resources that execute various data storage and data retrieval tasks. The execution platform 110 is coupled to cloud storage platform 104. The cloud storage platform 104 comprises multiple data storage devices 120-1 to 120-N. In some embodiments, the data storage devices 120-1 to 120-N are cloud-based storage devices located in one or more geographic locations. For example, the data storage devices 120-1 to 120-N may be part of a public cloud infrastructure or a private cloud infrastructure. The data storage devices 120-1 to 120-N may be hard disk drives (HDDs), solid state drives (SSDs), storage clusters, Amazon S3™ storage systems, or any other data storage technology. Additionally, the cloud storage platform 104 may include distributed file systems (such as Hadoop Distributed File Systems (HDFS)), object storage systems, and the like.

The execution platform 110 comprises a plurality of compute nodes. A set of processes on a compute node executes a query plan compiled by the compute service manager 108. The set of processes can include: a first process to execute the query plan; a second process to monitor and delete cache files using a least recently used (LRU) policy and implement an out of memory (OOM) error mitigation process; a third process that extracts health information from process logs and status to send back to the compute service manager 108; a fourth process to establish communication with the compute service manager 108 after a system boot; and a fifth process to handle all communication with a compute cluster for a given job provided by the compute service manager 108 and to communicate information back to the compute service manager 108 and other compute nodes of the execution platform 110.

In some embodiments, communication links between elements of the computing environment 100 are implemented via one or more data communication networks. These data communication networks may utilize any communication protocol and any type of communication medium. In some embodiments, the data communication networks are a combination of two or more data communication networks (or sub-Networks) coupled to one another. In alternate embodiments, these communication links are implemented using any type of communication medium and any communication protocol.

The compute service manager 108, metadata databases 112, execution platform 110, and cloud storage platform 104 are shown in FIG. 1 as individual discrete components. However, each of the compute service manager 108, metadata databases 112, execution platform 110, and cloud storage platform 104 may be implemented as a distributed system (e.g., distributed across multiple systems/platforms at multiple geographic locations). Additionally, each of the compute service manager 108, metadata databases 112, execution platform 110, and cloud storage platform 104 can be scaled up or down (independently of one another) depending on changes to the requests received and the changing needs of the network-based database system 102. Thus, in the described embodiments, the network-based database system 102 is dynamic and supports regular changes to meet the current data processing needs.

During typical operation, the network-based database system 102 processes multiple jobs determined by the compute service manager 108. These jobs are scheduled and managed by the compute service manager 108 to determine when and how to execute the job. For example, the compute service manager 108 may divide the job into multiple discrete tasks and may determine what data is needed to execute each of the multiple discrete tasks. The compute service manager 108 may assign each of the multiple discrete tasks to one or more nodes of the execution platform 110 to process the task. The compute service manager 108 may determine what data is needed to process a task and further determine which nodes within the execution platform 110 are best suited to process the task. Some nodes may have already cached the data needed to process the task and, therefore, be a good candidate for processing the task. Metadata stored in a metadata database 112 assists the compute service manager 108 in determining which nodes in the execution platform 110 have already cached at least a portion of the data needed to process the task. One or more nodes in the execution platform 110 process the task using data cached by the nodes and, if necessary, data retrieved from the cloud storage platform 104. It is desirable to retrieve as much data as possible from caches within the execution platform 110 because the retrieval speed is typically much faster than retrieving data from the cloud storage platform 104.

As shown in FIG. 1, the computing environment 100 separates the execution platform 110 from the cloud storage platform 104. In this arrangement, the processing resources and cache resources in the execution platform 110 operate independently of the data storage devices 120-1 to 120-N in the cloud storage platform 104. Thus, the computing resources and cache resources are not restricted to specific data storage devices 120-1 to 120-N. Instead, all computing resources and all cache resources may retrieve data from, and store data to, any of the data storage resources in the cloud storage platform 104.

Figure 2:
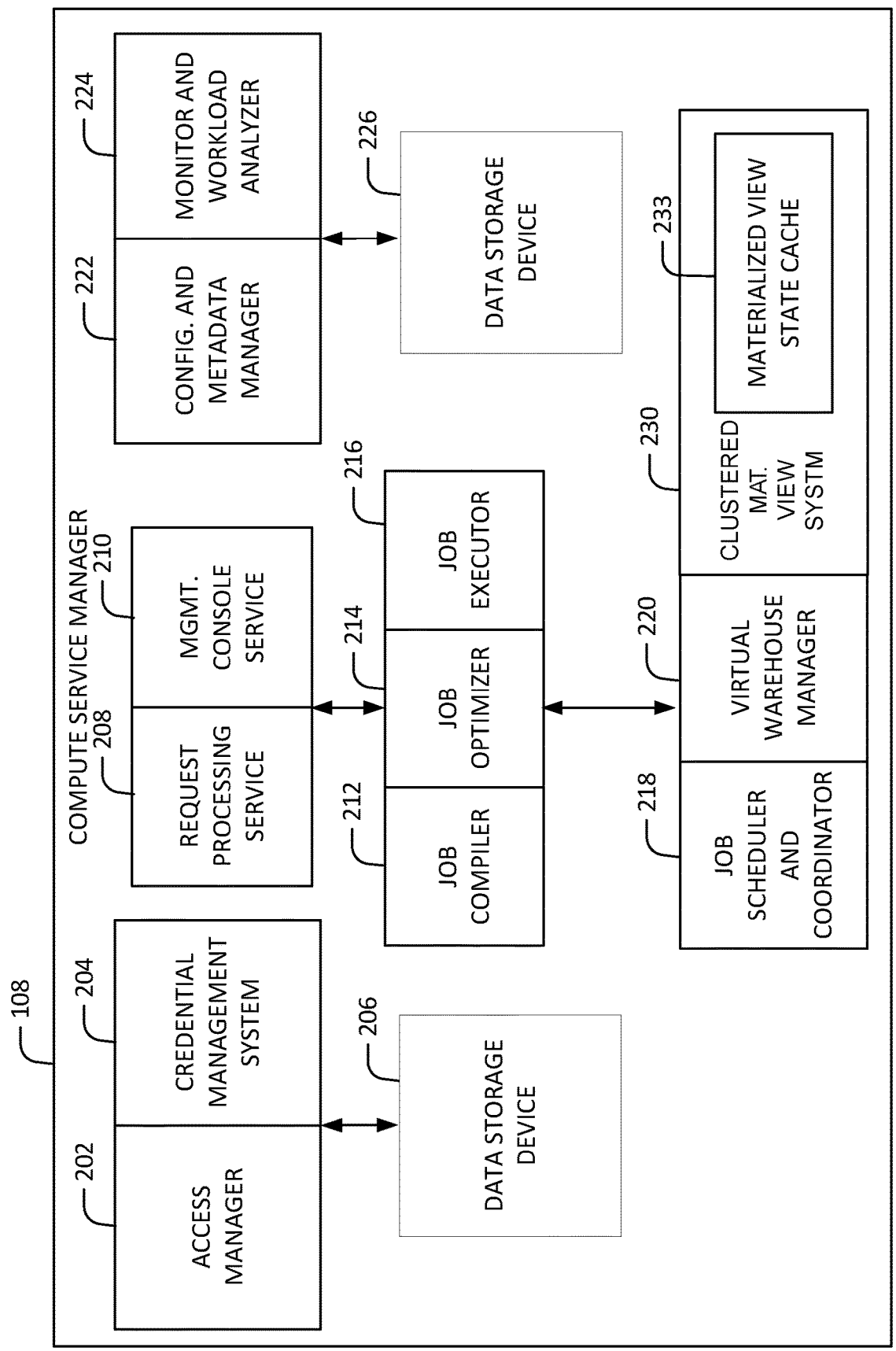
FIG. 2 is a block diagram illustrating components of a compute service manager, according to some example embodiments.

FIG. 2 is a block diagram illustrating components of the compute service manager 108, in accordance with some embodiments of the present disclosure. As shown in FIG. 2, the compute service manager 108 includes an access manager 202 and a credential management system 204 coupled to data storage device 206 (e.g., that stores access metadata), which is an example of the metadata databases 112. Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., an access metadata database in the data storage device 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the data storage device 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service 208 may determine the data to process a received query (e.g., a data storage request or data retrieval request). The data may be stored in a cache within the execution platform 110 or in a data storage device in cloud storage platform 104.

A management console service 210 supports access to various systems and processes by administrators and other system managers. Additionally, the management console service 210 may receive a request to execute a job and monitor the workload on the system.

The compute service manager 108 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 108.

A job scheduler and coordinator 218 sends received jobs to the appropriate services or systems for compilation, optimization, and dispatch to the execution platform 110. For example, jobs may be prioritized and then processed in that prioritized order. In an embodiment, the job scheduler and coordinator 218 determines a priority for internal jobs that are scheduled by the compute service manager 108 with other "outside" jobs such as user queries that may be scheduled by other systems in the database but may utilize the same processing resources in the execution platform 110. In some embodiments, the job scheduler and coordinator 218 identifies or assigns particular nodes in the execution platform 110 to process particular tasks. A virtual warehouse manager 220 manages the operation of multiple virtual warehouses implemented in the execution platform 110. For example, the virtual warehouse manager 220 may generate query plans for executing received queries. The cluster materialized view system 230 is configured to efficiently implement clustering and materialized database views. In the example illustrated, the cluster materialized view system 230 comprises a materialized view state cache 233 that stores metadata for changes made to partitions (e.g., deletion of a micro-partition) to support filtering by the cluster materialized view system 230, in accordance with some example embodiments. In some example embodiments, for each row in a given materialized view, the database system stores one or more links via metadata (e.g., key-value pairs) which represent which partitions (e.g., columnar stores) correspond to the row; that is, which base table partition a given row comes from. In some example embodiments, by scanning rows of a materialized view, the corresponding base table partitions are identified, such as from metadata in data storage device 226, such as key-value data or FoundationDB. In some example embodiments, whenever a given base table partition is removed (e.g., via a deletion statement), the file name of the partition (e.g., "partition_1") is stored in a materialized view state cache 233, such that the materialized view state cache 233 comprises a list of file names (e.g., "partition_1", "partition_5", "partition_abc", etc.) that have been removed for each base table of the network-based database system 102. In this way, the materialized view state cache 233 persists filter information for different tables on a runtime version of the data storage device 226 (e.g., FoundationDB). In some example embodiments, the cluster materialized view system 230 applies a filter as a not-in operation in the clustering process. For example, if a given row in a materialized view corresponds to a file name in the materialized view state cache 233, then the row is filtered out from the materialized view, after which the clustered materialized view system 230 performs the further operations such as data organizing (e.g., clustering by key, sort operations).

In some example embodiments, the clustered materialized view system 230 performs clustering operations (e.g., incremental clustering and re-clustering) to organize database data and performs pulling and compaction of materialized views. As discussed, the clustering of a database table is a process that reorganizes the physical layout of data in the table to improve query performance. Clustering and re-clustering can be made available as a DML statement that a client account can invoke manually. In some example embodiments, the clustering is performed automatically in increments to efficiently organize the data of the network-based database system 102. In some example embodiments, clustering of database data uses one or more storing operations in which the data can be ordered by value. Further details of clustering and incrementally clustering are found in U.S. Pat. No. 10,997,147, titled "Incremental Clustering of Database Tables," filed on Jul. 17, 2019, which is hereby incorporated in its entirety.

In some example embodiments, a materialized view is a view that persists query results automatically. In some example embodiments, the cluster materialized view system 230 performs maintenance of materialized views in a split operation, in which an addition of data (e.g., rows) is handled differently than deletion of the rows, which can function against the clustering processes, discussed above. In some example embodiments, the cluster materialized view system 230 performs a pull operation to pull from a log to identify newly added data (e.g., partitions, rows), and performs a compact operation to identify data (e.g., partitions, rows) in a given base table of a materialized view that should be removed from the materialized view. In some example embodiments, the cluster materialized view system 230 performs merging of one or more base tables with a corresponding materialized view to detect an update (e.g., new row, new data, new partition) to the base tables that are not reflected in the materialized view. The updates can comprise one or more of: adding, deleting, or updating rows in the source table since a prior refresh and/or a prior compaction of the materialized view. Further details of materialized view updates are found in U.S. Pat. No. 11,30, 186, titled "Incremental Refresh of a Materialized View," which is hereby incorporated in its entirety.

As illustrated, the compute service manager 108 includes a configuration and metadata manager 222, which manages the information related to the data stored in the remote data storage devices and in the local buffers (e.g., the buffers in execution platform 110). The configuration and metadata manager 222 uses metadata to determine which data files need to be accessed to retrieve data for processing a particular task or job. A monitor and workload analyzer 224 oversees processes performed by the compute service manager 108 and manages the distribution of tasks (e.g., workload) across the virtual warehouses and execution nodes in the execution platform 110. The monitor and workload analyzer 224 also redistributes tasks, as needed, based on changing workloads throughout the network-based database system 102 and may further redistribute tasks based on a user (e.g., "external") query workload that may also be processed by the execution platform 110. The configuration and metadata manager 222 and the monitor and workload analyzer 224 are coupled to a data storage device 226. Data storage device 226 in FIG. 2 represents any data storage device within the network-based database system 102. For example, data storage device 226 may represent buffers in execution platform 110, storage devices in cloud storage platform 104, or any other storage device.

As described in embodiments herein, the compute service manager 108 validates all communication from an execution platform (e.g., the execution platform 110) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by encryption where the key is unavailable.

Figure 3:
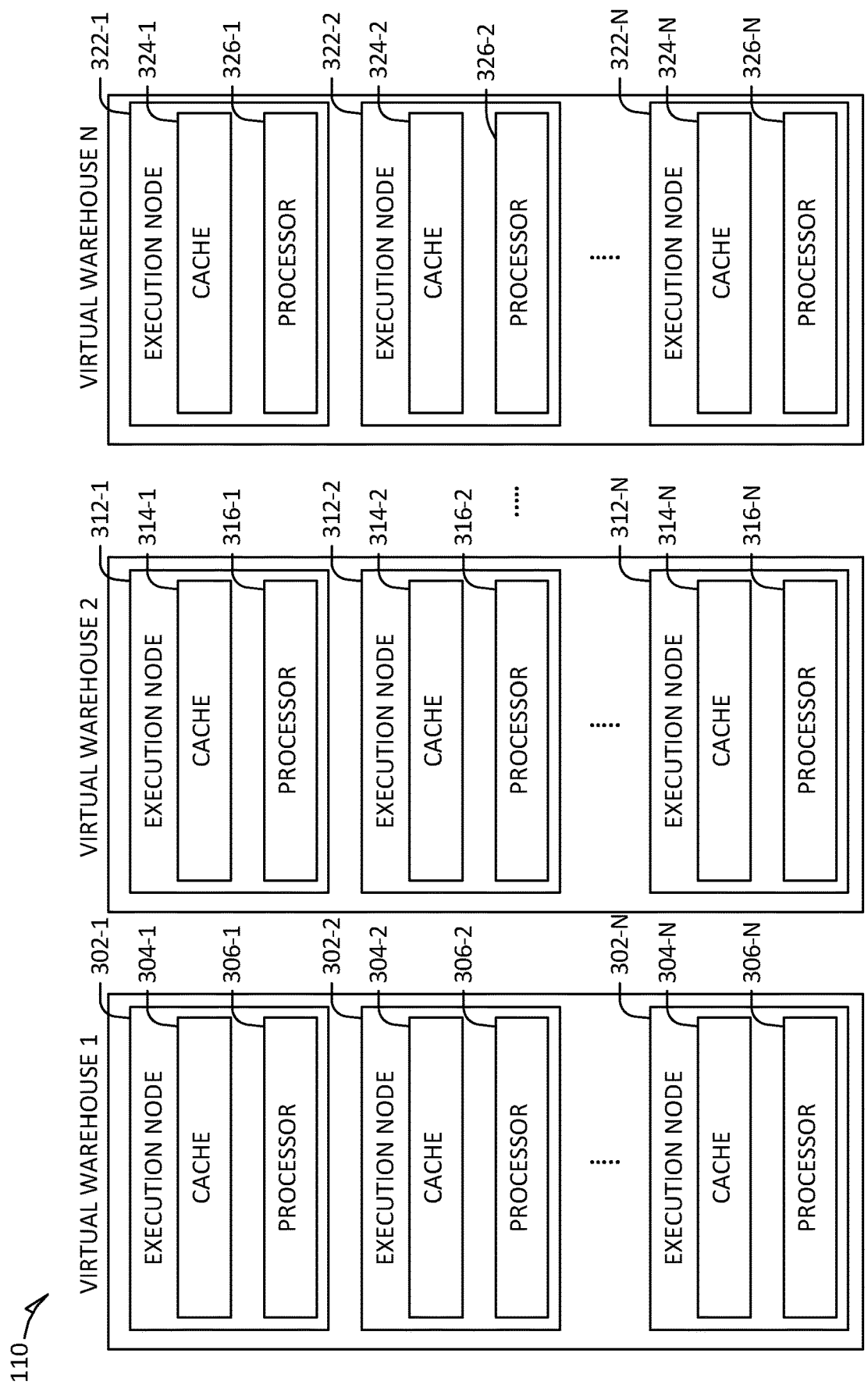
FIG. 3 is a block diagram illustrating components of an execution platform, according to some example embodiments.

FIG. 3 is a block diagram illustrating components of the execution platform 110, in accordance with some embodiments of the present disclosure. As shown in FIG. 3, the execution platform 110 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 110 can add new virtual warehouses and drop existing virtual warehouses in real-time based on the current processing needs of the systems and users. This flexibility allows the execution platform 110 to quickly deploy large amounts of computing resources when needed without being forced to continue paying for those computing resources when they are no longer needed. All virtual warehouses can access data from any data storage device (e.g., any storage device in cloud storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 120-1 to 120-N shown in FIG. 1. Thus, the virtual warehouses are not necessarily assigned to a specific data storage device 120-1 to 120-N and, instead, can access data from any of the data storage devices 120-1 to 120-N within the cloud storage platform 104. Similarly, each of the execution nodes shown in FIG. 3 can access data from any of the data storage devices 120-1 to 120-N. In some embodiments, a particular virtual warehouse or a particular execution node may be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse 3 includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in cloud storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some embodiments, the caches are implemented using high-speed memory devices that provide fast access to the cached data. Each cache can store data from any of the storage devices in the cloud storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor-intensive. Similarly, an execution node may be assigned more cache resources if the tasks performed by the execution node require a larger cache capacity.

Although virtual warehouses 1, 2, and N are associated with the same execution platform 110, the virtual warehouses may be implemented using multiple computing systems at multiple geographic locations. For example, virtual warehouse 1 can be implemented by a computing system at a first geographic location, while virtual warehouses 2 and N are implemented by another computing system at a second geographic location. In some embodiments, these different computing systems are cloud-based computing systems maintained by one or more different entities.

Additionally, each virtual warehouse is shown in FIG. 3 as having multiple execution nodes. The multiple execution nodes associated with each virtual warehouse may be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 110 is also fault tolerant. For example, if one virtual warehouse fails, that virtual warehouse is quickly replaced with a different virtual warehouse at a different geographic location.

A particular execution platform 110 may include any number of virtual warehouses. Additionally, the number of virtual warehouses in a particular execution platform is dynamic, such that new virtual warehouses are created when additional processing and/or caching resources are needed. Similarly, existing virtual warehouses may be deleted when the resources associated with the virtual warehouse are no longer useful.

In some embodiments, the virtual warehouses may operate on the same data in cloud storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
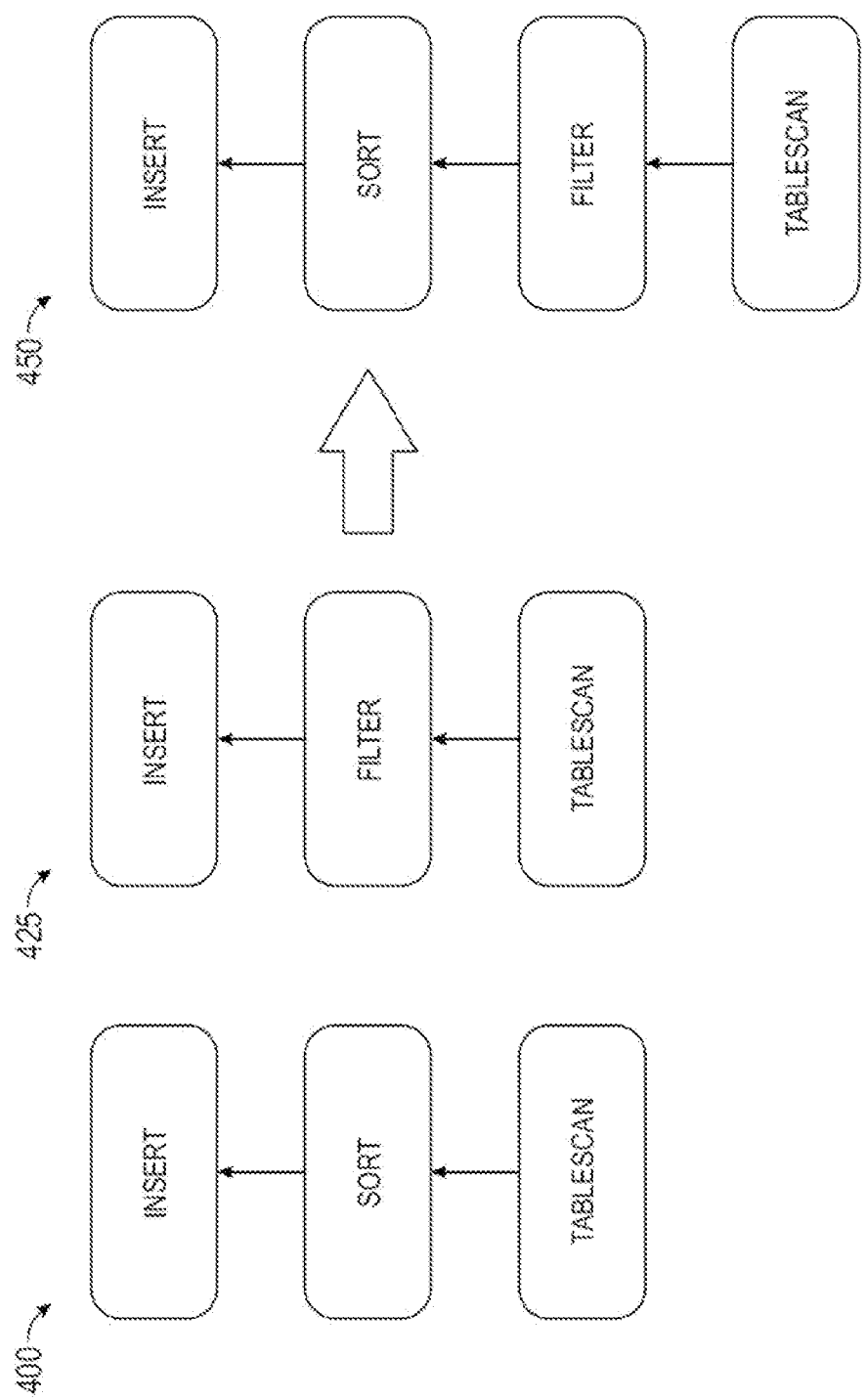
FIG. 4 shows database query plans for implementing maintenance for clustering materialized views, according to some example embodiments.

FIG. 4 shows database query plans for implementing maintenance for clustering and materialized views, according to some example embodiments. The clustering database pipeline 400 illustrates a clustering execution process of the network-based database system 102, in accordance with some example embodiments. As illustrated, the clustering database pipeline 400 includes a table scan operation which gathers data from one or more tables for clustering. The data from the table scan operation is then stored and inserted into the one or more tables in the sorted order thereby clustering the data, in accordance with some example embodiments. The compaction database pipeline 425 illustrates a materialized view compaction process in which a table scan operation is performed to gather the data for compaction processing. A portion of the data is then filtered to remove data (e.g., stale rows), which is then followed by inserting the filtered data to update the materialized view so that it is in compacted form. As discussed above, performing materialized view compaction on clustered data can cause inefficiencies due to the stale data still being included in the pipelines. The filtered clustering database pipeline 450 illustrates an efficient clustering pipeline for materialized views in accordance with some example embodiments. In the filtered clustering database pipeline 450, a table scan operation is performed to gather the data for processing (e.g., clustering). In some example embodiments, the materialized view state cache 233 is implemented by the cluster materialized view system 230, where the materialized view cache records which data items of the base tables have been modified or deleted. In some example embodiments, the filter of the filtered clustering database pipeline 450 is configured as a not-in filter, where the table scan collected data is then filtered such that the remaining data contains only the data that is not listed the materialized view state cache 233 (e.g., not in partitions having file names in the materialized view state cache 233). The remaining data is then sorted and inserted to reform the materialized view, in accordance with some example embodiments.

Figure 5A:
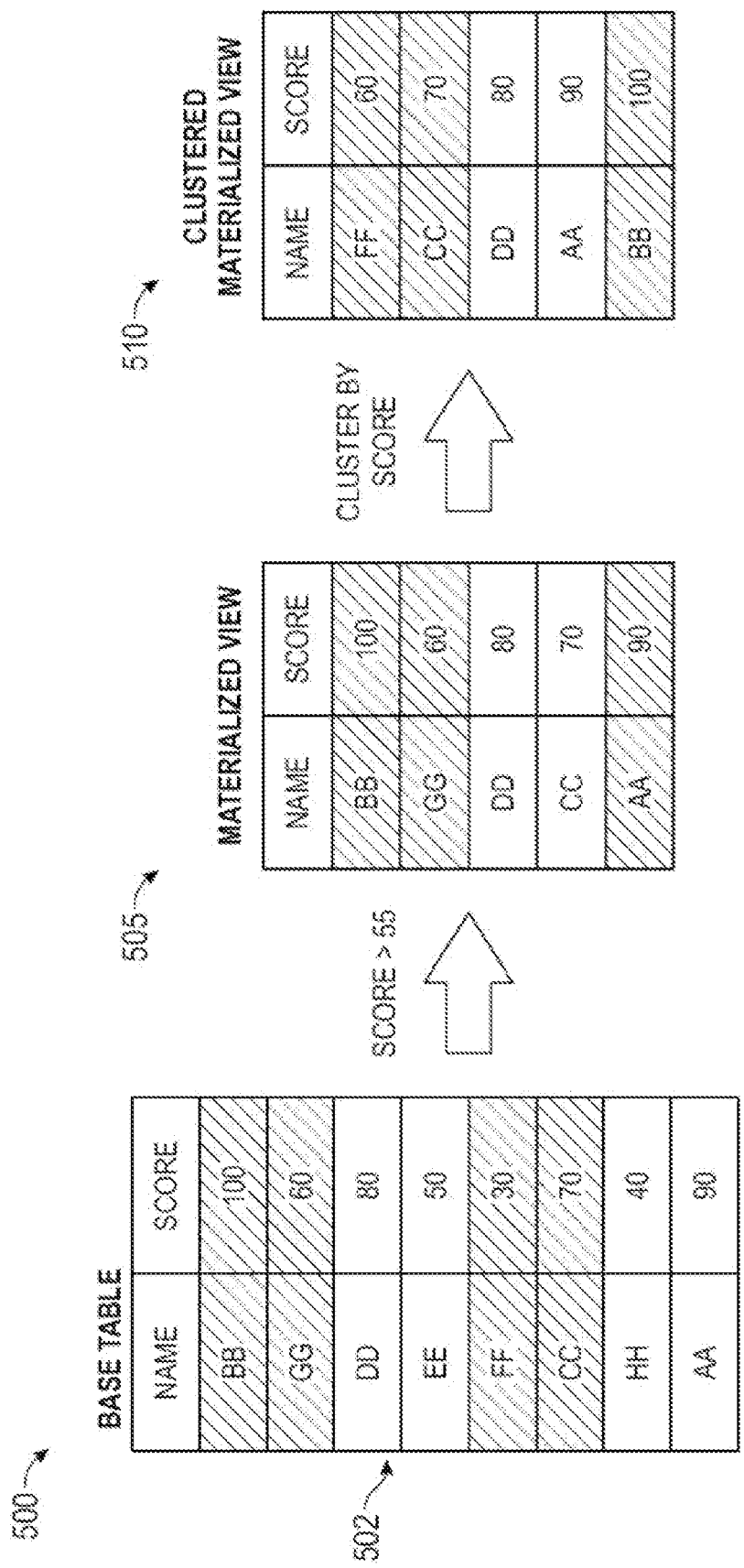
FIG. 5A and 5B show example partition layouts for clustering and compacting materialized views, according to some example embodiments.
Figure 5B:
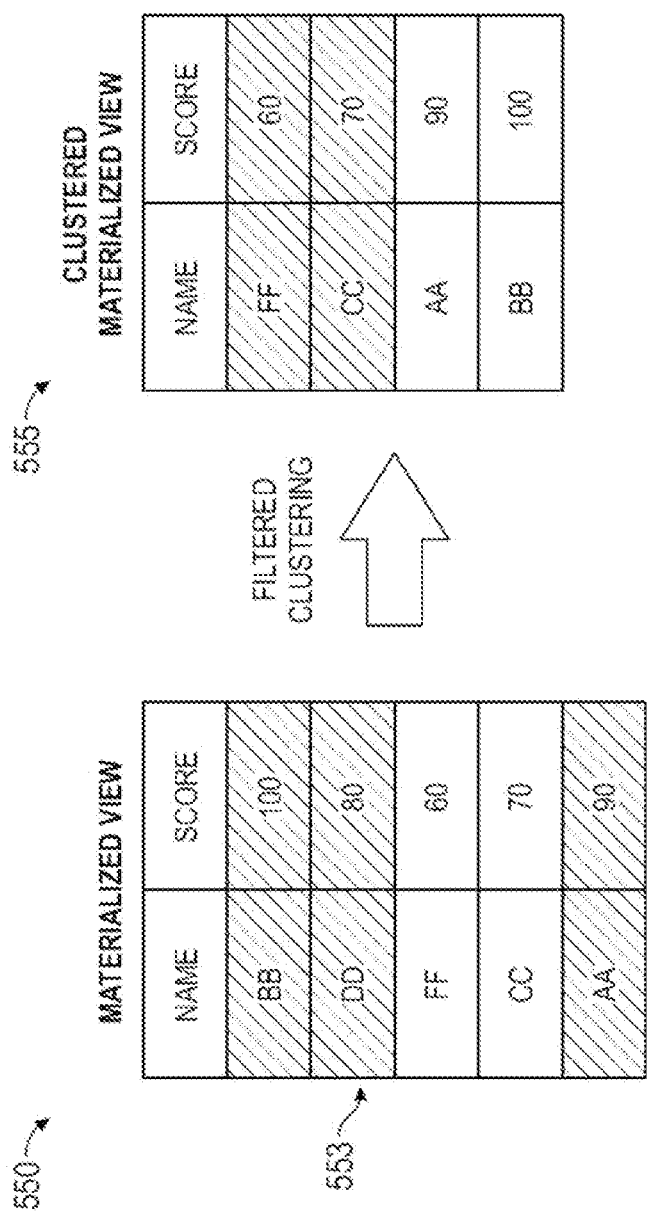

FIG. 5A shows example database partition layouts for clustering and materialized views, in accordance with some example embodiments. In the example of FIG. 5A and 5B, the rows are stored in units (e.g., partitions) that are indicated by blank and diagonal-lined filled rows. For example, in FIG. 5A, the BB and GG rows in the base table 500 correspond to first data store unit (e.g., batch, partition) having a first file name, the DD and EE rows in the base table 500 correspond to a second data store unit (e.g., partition, batch unit) having a second file name, the FF and CC rows in the base table 500 correspond to a third data store unit (e.g., batch, partition, micro-partition) having a third file name, and so on. Continuing, with reference to FIG. 5A, the base table 500 provides data to a materialized view 505 according to the materialized views configuration, such as a materialized view for only rows having score values above "55". The deleted data 502 (e.g., DD and EE rows) has been removed from the base table 500 (e.g., the rows are deleted, the partition storing those rows is deleted). As discussed above, although the items have been deleted from the base table 500, they are still included in the materialized view 505 (e.g., DD row). Further, as illustrated in the clustered materialized view 510, performing clustering to organize the data in the materialized view expends resources by clustering stale data (e.g., the DD row in clustered materialized view 510) into the re-organized partitions.

FIG. 5B shows example partition layouts for filtered clustering, in accordance with some example embodiments. In the example of FIG. 5B, the cluster materialized view system 230 implements the filtered clustering database pipeline 450 to perform efficient compaction and clustering of the database data. In FIG. 5B the materialized view 550 comprises data from one or more base tables (base tables not depicted in FIG. 5B). The stale data from the base tables that is included in the materialized view 550 includes deleted data 553 (e.g., the DD row). In some example embodiments, after performing one or more table scan operations using execution nodes (e.g., FIG. 3) to gather data concurrently, the cluster materialized view system 230 implements the materialized view state cache 233 to identify file names of base table partitions that are stale, and performs a not-in filter to filter out the rows and then performs a sort operation to generate the clustered materialized view 555, which has been re-clustered into optimized partitions without processing of the stale data.

Figure 6:
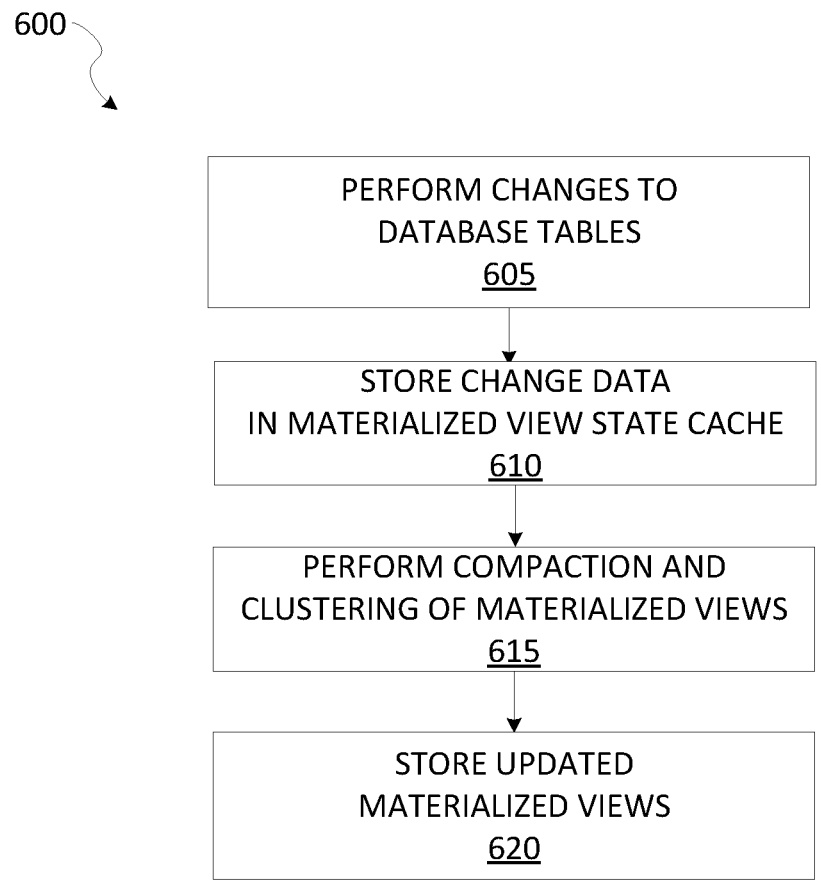
FIG. 6 shows a flow diagram of a method for implementing clustering and materialized view compaction, according to some example embodiments.

FIG. 6 shows a flow diagram of a method 600 for implementing efficient clustering and materialized views, in accordance with some example embodiments. The method 600 may be embodied in computer-readable instructions for execution by one or more hardware components (e.g., one or more processors) such that the operations of the method 600 may be performed by components of data platform 102, such as cluster materialized view system 230 . Accordingly, the method 600 is described below, by way of example with reference thereto. However, it shall be appreciated that method 600 may be deployed on various other hardware configurations and is not intended to be limited to deployment within the data platform 102.

Depending on the embodiment, an operation of the method 600 may be repeated in different ways or involve intervening operations not shown. Though the operations of the method 600 may be depicted and described in a certain order, the order in which the operations are performed may vary among embodiments, including performing certain operations in parallel or performing sets of operations in separate processes.

At operation 605, the network-based database system 102 performs one or more changes to the database data, such as updates or deletions of data from base tables. At operation 610, the cluster materialized view system 230 stores change metadata (e.g., file names) of base table partitions that have been removed. In some example embodiments, changes to all tables of a given database account (e.g., client account of client device 114) are stored in the materialized view state cache 233. In some example embodiments, only tables that provide data to existing stored materialized views have their change metadata tracked in the materialized view state cache 233. At operation 615, the cluster materialized view system 230 performs compaction and clustering of one or more materialized views. In some example embodiments, operation 615 is initiated as a background maintenance service of the network-based database system 102 that is performed periodically to keep the database data in an optimized efficient state. In some example embodiments, the operation 615 is initiated manually, e.g., in response to a command received from the client device 114. As discussed above, the compaction and clustering performed by the cluster materialized view system 230 implements clustering without stale data processing (e.g., via the database pipeline 450, FIG. 4). At operation 620, the cluster materialized view system 230 stores the updated clustered and compacted materialized views in the cloud storage platform 104, in accordance with some example embodiments.

Figure 7:
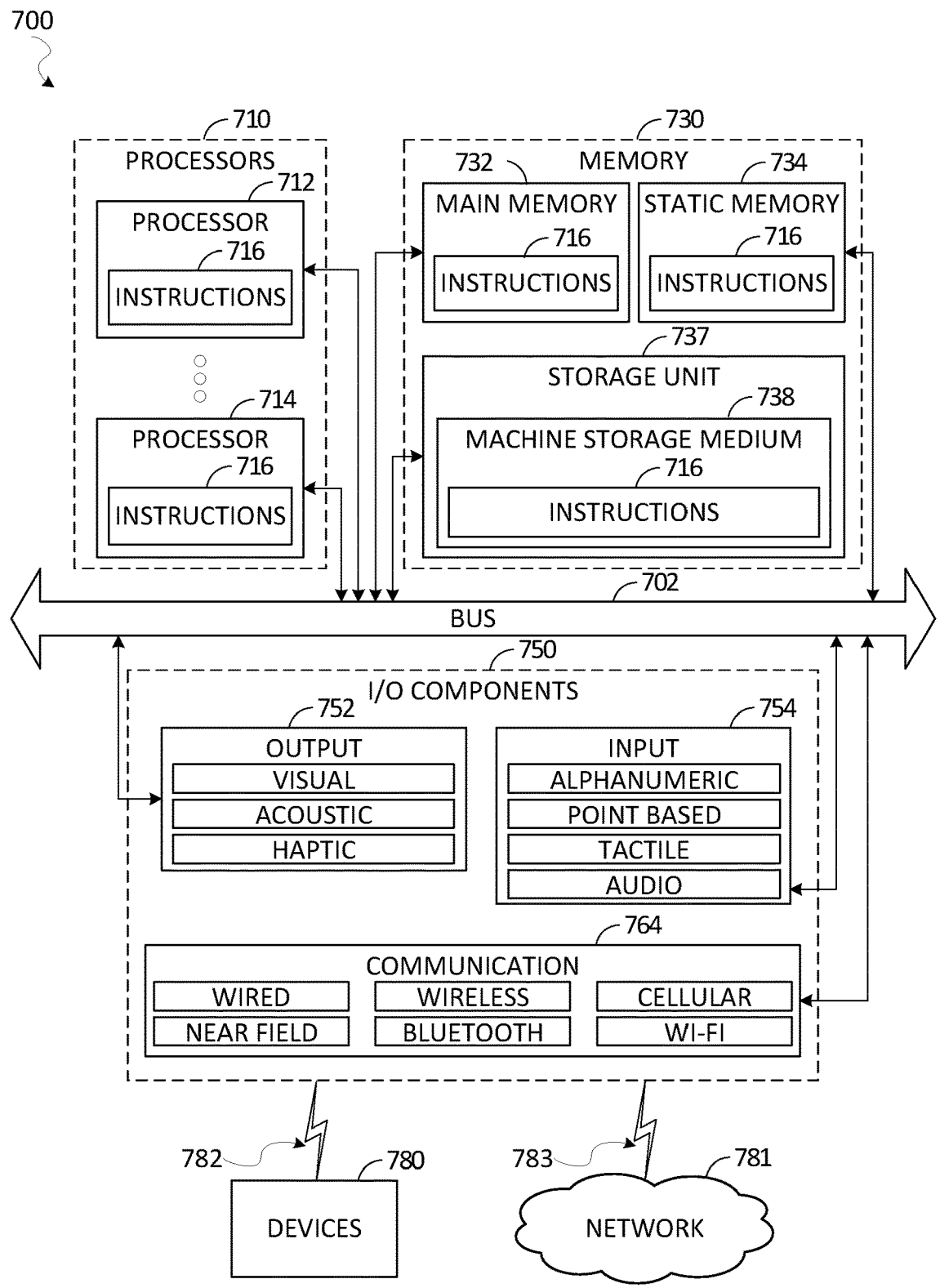
FIG. 7 illustrates a diagrammatic representation of a machine in the form of a computer system within which a set of instructions may be executed for causing the machine to perform any one or more of the methodologies discussed herein, in accordance with some embodiments of the present disclosure.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein may be executed. For example, the instructions 716 may cause the machine 700 to execute any one or more operations of any one or more of the methods described herein. As another example, the instructions 716 may cause the machine 700 to implemented portions of the data flows described herein. In this way, the instructions 716 transform a general, non-programmed machine into a particular machine 700 (e.g., the client device 114, the compute service manager 108, the execution platform 110) that is specially configured to carry out any one of the described and illustrated functions in the manner described herein.

In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 includes processors 710, memory 730, and input/output (I/O) components 750 configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors (sometimes referred to as "cores") that may execute instructions 716 contemporaneously. Although FIG. 7 shows multiple processors 710, the machine 700 may include a single processor with a single core, a single processor with multiple cores (e.g., a multi-core processor), multiple processors with a single core, multiple processors with multiple cores, or any combination thereof.

The memory 730 may include a main memory 732, a static memory 734, and a storage unit 737, all accessible to the processors 710 such as via the bus 702. The main memory 732, the static memory 734, and the storage unit 737 comprising a machine storage medium 738 may store the instructions 716 embodying any one or more of the methodologies or functions described herein. The instructions 716 may also reside, completely or partially, within the main memory 732, within the static memory 734, within the storage unit 737, within at least one of the processors 710 (e.g., within the processor's cache memory), or any suitable combination thereof, during execution thereof by the machine 700.

The I/O components 750 include components to receive input, provide output, produce output, transmit information, exchange information, capture measurements, and so on. The specific I/O components 750 that are included in a particular machine 700 will depend on the type of machine. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion and the grouping is in no way limiting. In various example embodiments, the I/O components 750 may include output components 752 and input components 754. The output components 752 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication may be implemented using a wide variety of technologies. The I/O components 750 may include communication components 764 operable to couple the machine 700 to a network 781 via a coupler 783 or to devices 780 via a coupling 782. For example, the communication components 764 may include a network interface component or another suitable device to interface with the network 781. In further examples, the communication components 764 may include wired communication components, wireless communication components, cellular communication components, and other communication components to provide communication via other modalities. The devices 780 may be another machine or any of a wide variety of peripheral devices (e.g., a peripheral device coupled via a universal serial bus (USB)). For example, as noted above, the machine 700 may correspond to any one of the client device 114, the compute service manager 108, the execution platform 110, and may include any other of these systems and devices.

The various memories (e.g., 730, 732, 734, and/or memory of the processor(s) 710 and/or the storage unit 737) may store one or more sets of instructions 716 and data structures (e.g., software) embodying or utilized by any one or more of the methodologies or functions described herein. These instructions 716, when executed by the processor(s) 710, cause various operations to implement the disclosed embodiments.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 781 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 781 or a portion of the network 781 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 716 may be transmitted or received over the network 781 using a transmission medium via a network interface device (e.g., a network interface component included in the communication components 764) and utilizing any one of a number of well-known transfer protocols (e.g., hypertext transfer protocol (HTTP)). Similarly, the instructions 716 may be transmitted or received using a transmission medium via the coupling 782 (e.g., a peer-to-peer coupling) to the devices 780. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods described herein may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

Described implementations of the subject matter can include one or more features, alone or in combination as illustrated below by way of example.

Example 1. A method for processing database views on a database, comprising: storing, in a state cache of the database, change metadata comprising changes on one or more source tables of the database; identifying a materialized view comprising data from the one or more source tables, a portion of the data of the materialized view comprising stale data that has been removed from the one or more source tables; compacting the materialized view to remove the stale data based on the change data in the state cache; clustering the materialized view to group data of the compacted materialized view; and storing the compacted and clustered materialized view in the database.

Example 2. The method of example 1, wherein the change data comprises a list of file names of storage units that store data portions of the one or more source tables.

Example 3. The method of any of examples 1 or 2, wherein compacting the materialized view comprises identifying a set of storage units that store table data of the one or more source tables.

Example 4. The method of any of examples 1-3, wherein compacting the materialized view further comprises applying a filter on the data of the materialized view to remove storage units from the set of storage units that have a file name in the list of files of storage units in the state cache.

Example 5. The method of any of examples 1-4, wherein compacting the materialized view comprises: storing the data of the materialized view in a temporary location in the database, compacting the data to remove the stale data, and inserting compacted data into the materialized view to generate a compacted materialized view.

Example 6. The method of any of examples 1-5, wherein clustering the materialized view comprises: storing the data of the materialized view in a temporary location in the database, clustering the data to group the data, and inserting clustered data into the materialized view to generate a compacted and clustered materialized view.

Example 7. The method of any of examples 1-6, further comprising: identifying the data of the materialized view in response using a table scan operation.

Example 8. The method of any of examples 1-7, wherein the database further comprises a plurality of execution nodes that manage a portion of the database, each execution node performing table scan operations and compaction and clustering of the data of the materialized view in parallel.

Example 9. The method of any of examples 1-8, wherein the clustering the materialized view comprises ordering data of the materialized view into a sorted order.

Example 10. The method of any of examples 1-9, wherein ordering the data comprises sorting the data of the materialized view into the sorted order using a sorting key.

Example 11. The method of any of examples 1-10, wherein a materialized view comprises an existing stored database view that incorporates table data from one or more table database objects of the database.

Example 12. The method of any of examples 1-11, wherein the state cache comprises storage unit file names of deleted storage units that stored data of the one or more source tables.

Example 13. A system comprising: one or more processors of a machine; and at least one memory storing instructions that, when executed by the one or more processors, cause the machine to perform operations implementing any of examples 1-12.

Example 14. A machine-readable storage device embodying instructions that, when executed by a machine, cause the machine to perform operations implementing any of examples 1-12.

What is claimed is:

1. A method comprising:
   storing, in a state cache of a database, change data comprising changes on one or more source tables of the database;
   identifying a materialized view comprising data from the one or more source tables, a portion of the data of the materialized view comprising stale data that has been removed from the one or more source tables;
   compacting the materialized view to remove the stale data based on the change data in the state cache, the compacting of the materialized view comprising:
     identifying a set of storage units; and
     applying a filter on the data of the materialized view to remove one or more storage units from the set of storage units in the state cache;
   clustering the materialized view to group data of the compacted materialized view; and
   storing the compacted and clustered materialized view in the database.

2. The method of claim 1, wherein the change data comprises a list of file names of the one or more storage units that store data portions of the one or more source tables.

3. The method of claim 2, wherein the identified set of storage units store table data of the one or more source tables.

4. The method of claim 3, wherein the one or more storage units from the set of storage units have a file name in the list of files of the one or more storage units in the state cache.

5. The method of claim 1, wherein compacting the materialized view comprises:
storing the data of the materialized view in a temporary location in the database, compacting the data of the materialized view in the temporary location to remove the stale data, and inserting compacted data from the temporary location into the materialized view to generate a compacted materialized view.

6. The method of claim 5, wherein clustering the materialized view comprises:
storing the data of the materialized view in a temporary location in the database, clustering the data to group the data, and inserting clustered data into the materialized view to generate a compacted and clustered materialized view.

7. The method of claim 1, further comprising:
identifying the data of the materialized view based on a table scan operation.

8. The method of claim 7, wherein the database further comprises a plurality of execution nodes that manage a portion of the database, each execution node performing a table scan, compaction, and clustering of the data of the materialized view in parallel.

9. The method of claim 1, wherein the clustering the materialized view comprises ordering data of the materialized view into a sorted order.

10. The method of claim 9, wherein ordering the data comprises sorting the data of the materialized view into the sorted order using a sorting key.

11. The method of claim 1, wherein a materialized view comprises an existing stored database view that includes table data from one or more table database objects of the database.

12. The method of claim 1, wherein the state cache comprises storage unit file names of deleted storage units that stored data of the one or more source tables.

13. A system comprising:
one or more processors of a machine; and
at least one memory storing instructions that, when executed by the one or more processors, cause the machine to perform operations comprising:
storing, in a state cache of a database, change data comprising changes on one or more source tables of the database;
identifying a materialized view comprising data from the one or more source tables, a portion of the data of the materialized view comprising stale data that has been removed from the one or more source tables;
compacting the materialized view to remove the stale data based on the change data in the state cache, the compacting of the materialized view comprising:
identifying a set of storage units; and
applying a filter on the data of the materialized view to remove one or more storage units from the set of storage units in the state cache;
clustering the materialized view to group data of the compacted materialized view; and
storing the compacted and clustered materialized view in the database.

14. The system of claim 13, wherein the change data comprises a list of file names of the one or more storage units that store data portions of the one or more source tables.

15. The system of claim 14, wherein the identified set of storage units store table data of the one or more source tables.

16. The system of claim 15, wherein the one or more storage units from the set of storage units have a file name in the list of files of the one or more storage units in the state cache.

17. The system of claim 13, wherein compacting the materialized view comprises:
storing the data of the materialized view in a temporary location in the database, compacting the data to remove the stale data, and inserting compacted data into the materialized view to generate a compacted materialized view.

18. The system of claim 17, wherein clustering the materialized view comprises:
storing the data of the materialized view in a temporary location in the database, clustering the data to group the data, and inserting clustered data into the materialized view to generate a compacted and clustered materialized view.

19. The system of claim 13, the operations further comprising:
identifying the data of the materialized view in response using a table scan operation.

20. The system of claim 19, wherein the database further comprises a plurality of execution nodes that manage a portion of the database, each execution node performing table scan operations and compaction and clustering of the data of the materialized view in parallel.

21. The system of claim 13, wherein the clustering the materialized view comprises ordering data of the materialized view into a sorted order.

22. The system of claim 21, wherein ordering the data comprises sorting the data of the materialized view into the sorted order using a sorting key.

23. The system of claim 13, wherein a materialized view comprises an existing stored database view that incorporates table data from one or more table database objects of the database.

24. The system of claim 13, wherein the state cache comprises storage unit file names of deleted storage units that stored data of the one or more source tables.

25. A non-transitory machine storage medium embodying instructions that, when executed by a machine, cause the machine to perform operations comprising:
storing, in a state cache of a database, change data comprising changes on one or more source tables of the database;
identifying a materialized view comprising from the one or more source tables, a portion of the data of the materialized view comprising stale data that has been removed from the one or more source tables;
compacting the materialized view to remove the stale data based on the change data in the state cache, the compacting of the materialized view comprising:
identifying a set of storage units; and
applying a filter on the data of the materialized view to remove one or more storage units from the set of storage units in the state cache;
clustering the materialized view to group data of the compacted materialized view; and
storing the compacted and clustered materialized view in the database.

26. The non-transitory machine storage medium of claim 25, wherein the change data comprises a list of file names of the one or more storage units that store data portions of the one or more source tables.

27. The non-transitory machine storage medium of claim 26, wherein the identified set of storage units store table data of the one or more source tables.

28. The non-transitory machine storage medium of claim 27, wherein the one or more storage units from the set of storage units have a file name in the list of files of the one or more storage units in the state cache.

29. The non-transitory machine storage medium of claim 25, wherein compacting the materialized view comprises:
   storing the data of the materialized view in a temporary location in the database, compacting the data to remove the stale data, and inserting compacted data into the materialized view to generate a compacted materialized view.

30. The non-transitory machine storage medium of claim 29, wherein clustering the materialized view comprises: storing the data of the materialized view in a temporary location in the database, clustering the data to group the data, and inserting clustered data into the materialized view to generate a compacted and clustered materialized view.

* * * * *